United States Patent Office 2,898,233
Patented Aug. 4, 1959

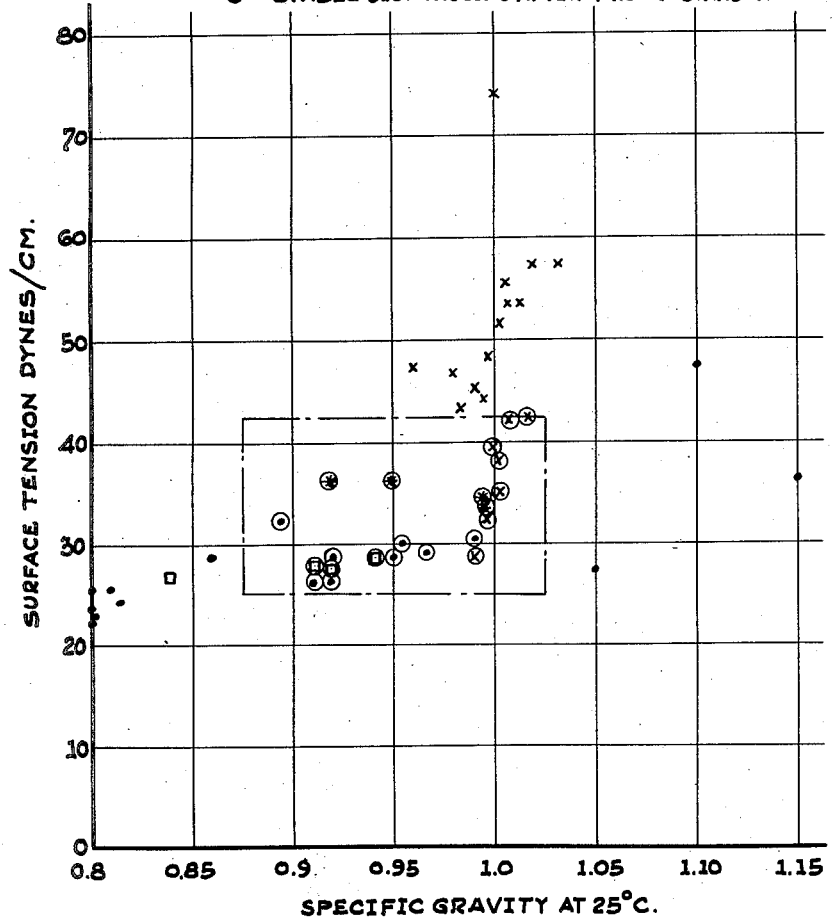

2,898,233

STABLE POLYETHYLENE DISPERSION CONTAINING NO EMULSIFYING AGENT AND METHOD OF COATING THEREWITH

Stanley Edward Hmiel, Beaver, Pa., assignor to Koppers Company, Inc., a corporation of Delaware Application July 31, 1958, Serial No. 752,220

20 Claims. (Cl. 117—103)

This invention relates to polymeric dispersions suitable for coating and to a method of applying such dispersions to surfaces or substrates. In one specific aspect, it relates to stable dispersions of linear polyethylene in a liquid medium. In another aspect, it relates to a method of forming continuous, impermeable adherent coatings on metal substrates and on other materials using such dispersions.

Linear polyethylene, a high density, crystalline polymer of ethylene, is extremely suitable as a coating material because of its low permeability and its remarkable chemical resistance to inorganic acids and bases and to most organic reagents. This polymeric material is readily available commercially in the form of a powder of relatively uniform particle size. Linear polyethylene can be conveniently made by polymerization processes involving the use of low pressures and complex catalyst systems, such as that described in Belgian Patent No. 533,362, issued to Dr. Karl Ziegler.

Various methods have been suggested for forming coatings of both high and low pressure polyethylene, including the flame spraying, fluid bed, sintering, and hot solvent application techniques.

The flame spraying method involves passing a finely divided polyethylene powder through a low oxidizing flame. The powder is thereby melted and is then deposited on the substrate to be coated. Post heating is sometimes required to obtain a smooth coating. This method is somewhat limited in that the use of the flame tends to cause degradation of the polymer and an adherent bond between the polymer and the substrate is not obtained.

The fluid bed technique comprises suspending finely divided polyethylene powder in an inert gas to form a fluid bed. The article to be coated is preheated to a temperature of 10-40° C. above the melting point of the polymer and is then immersed in the fluid bed for a short period of time. The polymer melts onto the surface of the article to form a continuous film. Post heating is required to obtain a smooth coating. Successful use of such a method is limited to the coating of small articles. Furthermore, adherence of the film to the substrate is somewhat limited, and the minimum coating thickness obtainable is about 20 mils.

The sintering method involves charging a finely divided polyethylene powder into a preheated rotating drum. The polymer particles adjacent the sides of the drum adhere thereto and excess polymer is discharged. A post heating treatment with rotation is required to form a continuous and completely fused coating. This method is limited to the coating of small drums or inner surfaces of rotating pipes.

It has also been proposed to form polyethylene coatings by dissolving the polyethylene in a hot solvent, e.g. boiling xylene, and thereafter applying the hot solution to the substrate. This method is rather hazardous because of the flamability of xylene and other organic solvents. Furthermore, only low concentrations of polyethylene, i.e. 5–10%, can be dissolved conveniently in such solvents. The coatings made by this method have limited adherence and are somewhat permeable.

Workers in the art have developed dispersions or quasi-dispersions of high pressure, or nonlinear polyethylene, but because of the difference in the physical characteristics of the two types of polyethylene, the dispersion systems suitable for coating with high pressure polyethylene are unsatisfactory for use with low pressure, or linear polyethylene. The processes described hereafter are typical of the non-linear or high pressure polyethylene dispersion systems.

U.S. Patent 2,313,144 describes a method whereby nonlinear polyethylene is dissolved in an organic solvent not miscible with water and the resulting solution is emulsified in an aqueous medium in the presence of an emulsifying agent. The solvent is then vaporized from the aqueous emulsion. The method of this patent is unfortunately not applicable to making continuous, impermeable adherent coatings using linear polyethylene. The high temperatures involved cause degradation of the ethylene polymer, which results in the formation of permeable coatings. Furthermore, the presence of the emulsifying agent within the coating tends to destroy the continuity of the polymeric film.

U.S. Patent 2,384,848 relates to a method of making high pressure polyethylene dispersions comprising dissolving the polymer in an organic solvent boiling between 80 and 175° C., heating the mixture of polymer and solvent above about 110° C. and cooling the solution slowly to a temperature below 35° C. with rapid agitation. The alternate heating and cooling required by this process is disadvantageous in that degradation or oxidization of the polymer occurs and the resulting coatings are not impermeable. Moreover, linear polyethylene, in contrast with nonlinear polyethylene, is not readily dissolved in organic materials, except at very high temperatures. The use of such temperatures makes the preparation of dispersions quite hazardous.

One proposed process (French Patent No. 1,050,223) consists of producing an aqueous dispersion of nonlinear polyethylene without the use of an emulsifying agent by agitating the polyethylene powder with water and a small amount of an organic compound which is miscible with water and which can be removed from the dispersion by evaporation at temperature lower than 200° C. Unfortunately, while this system avoids the difficulties which obtain using high temperatures to prepare a solution of polyethylene powder, the system is still not suitable for linear polyethylene. Attempts to make dispersions of linear polyethylene using such a technique resulted in either unstable dispersions which were unsuitable for coating or dispersions which gave a non-adherent, non-uniform, permeable coating. See Example VII, infra.

Heretofore, there has been no successful method for coating surfaces with linear polyethylene using a disperssion technique. I have discovered a novel coating process using a stable linear polyethylene dispersion which can be conveniently prepared at ambient temperatures, and which can be applied to surfaces to give an adherent, impermeable, continuous, flexible coating of high impact resistance. My dispersions can be used for coating an almost unlimited variety of surfaces by a method that obviates the difficulties faced by prior art workers.

It is, therefore, an object of the present invention to prepare stable dispersions of linear polyethylene suitable for coating. It is a further object to provide a novel method for making such dispersions, and a novel coating process capable of producing adherent, impermeable, continuous, flexible linear polyethylene coatings of good impact and peel resistance on metal substrates and various other surfaces.

In accordance with the invention, a polymeric dispersion containing up to 60% by weight of linear polyethylene is prepared by dispersing polyethylene powder of a relatively uniform particle size in a liquid medium having a surface tension of about 25 to 42.5 dynes per centimeter and a specific gravity of about 0.875–1.025.

The amount of polyethylene in the dispersion, i.e. the polyethylene solids content of the dispersion, can be varied according to the final coating thickness desired. Excellent coatings of a thickness ranging from 2 to 20 mils are obtained using a dispersion containing from 15–60% by weight polyethylene, based on the total weight of the dispersion. To prepare a dispersion which can be easily sprayed, it is especially advantageous to use from 20-35% by weight polyethylene powder.

The particle size of the polyethylene powder suitable for the dispersions varies widely. A particle size in the range of 20–325 mesh (U.S. sieves) is quite satisfactory. It is advantageous to have a powder of relatively uniform particle size, preferably one which has been screened through a 40 mesh screen.

The polymer used in the invention is a linear polyethylene. Such a polymer is made and sold commercially by the Koppers Company, Inc. as "Super Dylan," by the Phillips Petroleum Company as "Marlex-50," by the Hercules Powder Company as "Hi-Fax," by the Celanese Corp. as "Fortiflex," and by W. R. Grace and Company as "Grex."

The liquid medium of the present invention comprises water in admixture with organic liquids, organic liquids, or mixtures of organic liquids. It is essential, for purposes of the invention, that the liquid dispersion medium has a surface tension of about 25–42.5 dynes per centimeter and a specific gravity of about 0.875–1.025. If either the surface tension or the specific gravity of the liquid medium falls outside of these limits, the resulting dispersion is unstable, and is therefore, unsuitable for the coating method of the present invention. By the term "about" I mean to embrace the normal limits of experimental error with respect to measurement of the surface tension and the specific gravity of the liquid medium.

For purposes of the invention, surface tension is conveniently measured by a commercially available tensiometer, e.g. a Cenco Du-Nuoy tensiometer. The tensiometer measures directly the relative liquid to air surface tension of the medium. The standard surface tension in dynes per centimeter at 25° C. is obtained by mathematical correction of the experimentally determined value. The specific gravity of the liquid medium is conveniently measured by a standard hydrometer, e.g. a Taylor hydrometer. Referring now to the drawing, the figure is a plot of surface tension in dynes/cm. at 25° C. versus specific gravity at 25° C. The figure, based on data appearing in Example V, infra, clearly demonstrates the criticality of the indicated limits.

To prepare the water base dispersions of the invention, it is necessary to choose an organic liquid sufficiently soluble in water to effect reduction of the surface tension to the required degree. The relative proportions of water and organic liquid are not critical; however, it is essential that the amount of organic liquid added to and dissolved in the water results in a liquid medium having a specific gravity and surface tension falling within the critical limits described aforesaid. Any organic liquid having a boiling point below the baking temperature of the coating process, i.e. below about 230° C., provided that it is soluble in water to the necessary degree, can be used in preparing the dispersions. Illustrative organic liquids include, but are not limited to, aliphatic alcohols, e.g. methanol, ethyl alcohol, tertiary butyl alcohol, n-amyl alcohol, propylene glycol, and hexylene glycol; glycol ethers; e.g.: propylene glycol methyl ether, dipropylene glycol methyl ether, tripropylene glycol methyl ether, and diethylene glycol methyl ether; esters, e.g.: diethylene glycol monomethylether acetate, diethylene glycol monoethyl ether acetate, and ethylene glycol monoethyl ether acetate; ketones, e.g.: methyl ethyl ketone, diacetone alcohol, and acetone; aldehydes, e.g.: acetaldehyde, formaldehyde, and crotonaldehyde; and aliphatic nitrogen compounds, e.g.: ethylenediamine, propylene aminediamine, monoethylamine, and the like.

The above, and other organic liquids can be added to water in amounts up to their limit of solubility as specified in Lange, Handbook of Chemistry, 9th edition, 1956, to adjust the surface tension and specific gravity of the liquid medium to within the prescribed limits. The water base dispersions are especially suitable for applications wherein considerable precaution must be taken to reduce attendant fire hazards.

Organic liquids or mixtures of organic liquids having a surface tension and specific gravity within the prescribed range can be also used as the liquid medium for my novel dispersions. Illustrative organic liquids which can be used either alone or in admixture with other organic liquids include aliphatic hydrocarbons, e.g. petroleum naphtha, mineral oil, and nonene, aromatic hydrocarbons, e.g. benzene, toluene, xylene, ethylbenzene, nitrobenzene, styrene, diethylbenzene and polyethylbenzene; and the organic liquids listed aforesaid in connection with the water base dispersions.

I have noted that in certain bases the organic liquid, if it has the proper density and surface tension, can be used by itself as the dispersion medium. Hexylene glycol is a good example of such a liquid. In other cases, organic liquids which are miscible with each other can be combined to produce a medium having the proper density and surface tension. Xylene is exemplary of organic liquids which are unsuitable by themselves as a dispersion medium. However, xylene can be combined with other organic liquids, such as tripropylene glycol methyl ether, to produce an eminently suitable medium having the required specific gravity and surface tension.

Since linear polyethylene has an extremely high chemical resistance, the choice of organic liquids for preparing the dispersions is relatively unlimited. One should, however, for purposes of the invention, choose an organic liquid which is relatively inert to linear polyethylene at room temperatures.

The stability of the dispersions prepared by the method hereinbefore described is of particular importance. By "stable" I mean that substantially no separation of the liquid and polymer phases will occur within a minimum period of four hours after preparation of the dispersion. If a stable dispersion is not achieved, sedimentation or floatation of the polymer in the liquid medium occurs, depending upon the relative specific gravity of the polymer and medium. Sedimentation causes a plugging of the nozzle used during spray coating operations. If the polymer floats on the surface of the liquid medium, it has a tendency to remain behind during spraying and no coating is obtained. Unstable dispersions are likewise unsuitable for dip coating, in that if sedimentation or floatation occurs, deposition of the polymer particles on the surface to be coated is not achieved.

To form the dispersions of the invention, linear polyethylene powder is screened to a relatively uniform size, preferably through a 40 mesh screen (U.S. sieves) to remove large agglomerates and any foreign matter that may be present. The liquid dispersion medium is formed by selecting one of the combination of the liquids described aforesaid to provide a medium having the proper surface tension and specific gravity. The liquid medium is placed in a suitable container and measured amounts of polymer powder are added thereto with agitation. For the preferred dispersions of the invention, i.e. those having a polyethylene content of 20–35% by weight, only moderate agitation, such as that obtained with a propeller type agitator is required. To prepare dispersions containing up to 60% by weight of polyethylene, high shear mixing equipment is advantageously used. A baffled mixing tank or container is helpful in achieving a uniform dispersion.

The time required for agitation depends upon the desired polyethylene solids content of the particular dispersion. Generally speaking, a uniform dispersion can be prepared in a period of 5–15 minutes. The powder should be added continuously to the liquid medium during the formation of the dispersion in order to insure adequate wetting of the particles.

Alternatively, to form the dispersions, the liquid medium can be added to the polyethylene powder. Except in the preparation of small batches of dispersion, no particular adavntage is seen in such a technique because of the difficulty involved in wetting the surface of the powder.

The dispersions are preferably prepared at ambient temperatures, although higher or lower temperatures can be used if desired. It is advisable to avoid temperatures higher than about 75° C. to avoid any appreciable oxidation or degradation of the polymer, since coatings made using an oxidized polymer, i.e. a polymer having a high carbonyl content, generally are permeable, and are sometimes discontinuous. The temperature used should not exceed the boiling point of the lowest boiling material of the liquid medium.

The dispersion may be used for coating immediately after its preparation. It is sometimes desirable to allow the dispersions to age for a period of four to sixteen hours or longer, without agitation, in order to completely wet the polymer. The aging period seems to allow the liquid medium to permeate more thoroughly the pores of the polymer. This results in the removal of air from the interior of the polymer structure and, since better heat transfer is accomplished during the baking of the coating, the resulting coatings appear to be smoother in appearance and to have improved continuity. If desired, the dispersions of the invention may be stored for six months or longer in a suitable closed container. If any settling or floatation of the polymer occurs, the dispersion may be regenerated using moderate agitation to form again a stable dispersion.

Substrates suitable for coating with the linear polyethylene dispersions of the present invention include, but are not limited to, cold rolled steel, hot rolled steel, stainless steel, various steel alloys, wrought iron, cast iron, aluminum, aluminum foil, copper, glass, wood, paper, cellulosic fibers, cardboard, cement, etc.

The particular substrate to be coated should generally be cleaned prior to the coating process. Descaling, if necessary, may be conveniently accomplished by solvent action or acid pickling. To promote adherence of the coating it is sometimes advantageous to roughen the surface of the substrate, e.g. to sand or grit blast, before applying the coating.

My novel linear polyethylene dispersions can be applied by spraying, dipping, or flow coating techniques.

Spraying is accomplished using any conventional spray equipment. Commercially available spray guns, such as Binks No. 18 or De Vilbiss PCGA–502, equipped with fluid nozzles of sufficient size to permit passage of the polyethylene particles in dispersion are eminently suitable. The gun is connected with an air compressor to deliver a constant supply of air.

The spray apparatus can be arranged as a pressure system or a siphon system, or a combined pressure and siphon system. In the pressure system, pressure is applied directly to the pot containing the dispersion and the dispersion is thereby forced through the spray nozzle, where it can be internally or externally atomized to produce a uniform spray. In the siphon system, a stream of air is drawn over the dip tube of the pot, thereby causing a vacuum, and pulling the dispersion through the nozzle.

As in the case of the pressure system, the dispersion can be internally or externally atomized. The above equipment may be conveniently operated at pressures of 15–30 p.s.i.g. to produce good spray coatings. Higher pressures may be used if desired, but often the use of a higher pressure causes excessive volatilization of the liquid medium, and the resulting coating is powdery and has diminished adherence. This effect of higher pressures may be offset by adjustment in the atomization of the spray. To spray coat, the stable dispersions are placed in the equipment hereinbefore described, and sprayed on to the substrate to give a substantially uniform application of wetted polyethylene powder thereon. The thickness of the coating is dependent upon the amount of wetted powder uniformly deposited on the substrate, and may be built up as desired by continued spraying.

To coat articles of relatively small size, dip coating may be more convenient than spray coating. In this case, the article is immersed in the dispersion until substantially uniform pick-up of the wetted powder is obtained on the surface of the article.

The stable dispersion may also be flowed onto a surface to give a uniform coating. The interior of objects such as pipe may be coated by rotating the pipe with one end raised slightly, and flowing the coating through the pipe until the desired pick-up is obtained, or until a uniform coating of the desired thickness of wetted powder is formed on the interior surface.

Dispersions may be applied to substrates at ambient or elevated temperatures. In some cases, for instance when a water base dispersion is applied to steel, it is advantageous to preheat the steel in order to evaporate the water quickly, and to minimize the danger of rust formation. Rust formation may also be overcome in a manner hereinafter described.

The continuous adherent film or coating is formed on the surface of the subtrate by baking or fusing the uniform layer of wetted polymer deposited on the substrate by one of the aforesaid techniques. Fusion is accomplished by heating the coated substrate at temperatures ranging between 175–230° C. If too high a temperature is used, excessive degradation of the linear polyethylene will occur, and the resulting film will be discontinuous and permeable. If too low a temperature is used, the film will lack continuity and its adherence will be greatly diminished.

The baking or fusion time depends upon the thickness of the layer of wetted polyethylene and the temperature used. For thicker layers of polyethylene and lower fusion temperatures a longer heating time is required. Generally speaking, a 2–30 minute period is quite suitable.

After fusion is obtained, the hot, coated substrate is cooled to provide the finished product. Cooling may be accomplished by a rapid water quench or alternatively, gradual air cooling may be used. Water cooling or quenching is especially advantageous, in that it results in a transparent, glossy coating. Slow cooling in air results in a somewhat translucent coating, but it has the advantage that practically no shrinkage of the coating occurs. For pigmented or colored coatings, which will be hereinafter described, air cooling is quite suitable, since transparency is not a required property of the finished coating.

The thickness of the coating obtained per pass by either spraying, dipping or flowing, ranges between 2 and 20 mils, depending upon the amount of polymer applied to the surface of the substrate. Excellent coatings, having a thickness of about 8 mils, are conveniently formed in a single spray coating operation. For thicker coatings, a second coating may be applied to the cooled, coated substrate by any of the aforementioned techniques. Here again the substrate may be at ambient or elevated temperatures, during the coating process. The thickness of the coating can be built up to about 30 to 35 mils using multiple coating techniques.

I have already indicated that by my novel coating process I am able to produce, on a wide variety of substrates, a continuous, adherent flexible coating of linear polyethylene of high impact and peel resistance.

The continuity of the finished coating is tested with a commercially available 30,000 volt spark tester, e.g. a Fisher scientific vacuum leak tester. The coatings provided by my invention are free of pinholes at a minimum coating thickness of 8±2 mils.

The flexibility of the coatings is tested using a conical or standard mandrel. Flexible substrates coated by the method of my invention can be bent almost 180° with a ⅛" arc at the bend without rupture of the coating.

Impact resistance is conveniently measured by a Gardner Variable Impact Tester. The coatings of my invention will withstand reverse impact of up to 56 in.-lbs. using a ½" diameter ball without rupturing the coating.

Peel resistance of the coatings of my invention is determined by scoring the coating in parallel lines ½" apart. With a ½" blade knife an attempt is made to peel off the coating from within the scored lines. The coatings of the present invention cannot be peeled off, using this technique.

If the coatings of the invention are to be applied to substrates as a protective coating, particularly a coating intended to be exposed to chemical action, such as solvents, acids, etc., it is necessary to have a virtually impermeable coating. The unmodified coatings made by the method of the present invention are impermeable. However, it is sometimes desirable to insure against oxidation of the polymer by adding to the dispersion a small amount, i.e. from 0.01–0.1% based on the weight of the polyethylene of an anti-oxidant, such as di-tertiary butyl paracresol, a commercially available product sold by Koppers Company as "DBPC." Other suitable antioxidants include 2,6-di-tertiary butyl-3-methyl phenol, 4,4-thiobis (6-t-butyl metacresol), thiobetanaphthenol, 2-naphthalenethiol, and the like.

If a water base dispersion is used for coating steel or wrought iron, it is often desirable to have in the dispersion a small percentage of rust inhibitor, e.g. from 0.01–0.05% based on the weight of the polyethylene, of sodium nitrite, normal propylamine, calcium stearate, or the like.

The ultraviolet light stability of the coatings of the invention can be improved by adding to the dispersion a small percentage, e.g. from 0.01–0.1% based upon the weight of polyethylene of an ultraviolet light screening agent, such as 5-chloro-2-hydroxybenzophenone, 2,4-dibenzoyl resorcinol, phenylsalicylate, and the like. From 0.5 to 5% graphite, based upon the weight of the polymer can be added to the dispersion of the invention to give a coating of improved lubricity.

If it is desired to produce colored coatings by the method of the present invention, a small amount, e.g. 0.1–10% based on the weight of the polyethylene powder of a suitable pigment can be added to the dispersions of the invention before application, without the use of any dispersing or emulsifying agents for the pigment. Suitable pigments include, but are not limited to, cadmium sulfide selenide, cadmium sulfide, phthalocyanine green, chromic oxide, phthalocyanine blue, $TiO_2$(anatase), $TiO_2$(rutile), and zinc oxide.

The coatings made by the method of the invention are eminently suitable as protective coatings, electrical insulators, and draw lubricants. The high chemical resistance of the linear polyethylene with respect to organic solvents, acids, caustic inorganic salts, etc. makes the coatings of the present invention especially desirable for eliminating corrosion problems in steel containers, tank and process lines, and automotive and marine parts. The low coefficient of the friction of linear polyethylene coatings makes them quite suitable for applications wherein surface decontamination is a serious problem. The coatings also provide excellent electrical insulation, hence it is extremely desirable to coat items such as hand tools and motor windings to avoid shorting out, which occurs on metal surfaces. The low coefficient of friction of the polyethylene coating can also be utilized to advantage in the preparation of coated objects wherein ice release is desirable; for example the ice trays of the household refrigerator can be effectively coated and the tendency of the ice to adhere to the metal separators is greatly diminished.

My invention is further illustrated by the following examples:

EXAMPLE I

A 60 gram quantity of linear polyethylene powder, sold commercially by the Koppers Company, Inc., as "Super Dylan," containing 0.05% calcium stearate, as a rust inhibitor, was screened through a 40 mesh screen (U.S. sieves). A dispersion medium was prepared consisting of 120 grams of distilled water, 40 grams of hexylene glycol, 30 grams of propylene glycol monomethyl ether, and 0.05% Santonox, a commercially available antioxidant described by its manufacturer as 4,4-thiobis (6-t-butyl-metacresol). The dispersion medium thus prepared had a specific gravity of 0.995 at 25° C. and a surface tension of 34.9 dynes/cm. at 25° C. The polyethylene powder was added to the dispersion using continuous agitation provided by a Lightnin Mixer, a standard commercial propeller-type agitator. After a ten minute period, the dispersion was completely stable and uniform. The polyethylene solids content of the dispersion was 25%.

Four metal panels, i.e., aluminum, copper, cold rolled steel, and hot rolled steel, were cleaned and degreased. The stable dispersion was applied to these panels using a siphon-type spray gun (De Vilbiss PMBC). Spraying was continued until a substantially uniform coating of the wetted polyethylene was obtained on each of the panels. The coated panels were baked in a forced air circulation oven at a temperature of 205° C. for fifteen minutes, and were thereafter cooled by quenching in a water tank.

In each case, the resulting polyethylene coating was continuous, i.e. there were no pin holes per half square foot of coated surface. The coatings had a thickness of 8 mils and were transparent, smooth and glossy in appearance. They were flexible (no rupture in ⅛" mandrel test) and had excellent impact resistance (56 inch-pounds reverse impact using a ½" diameter ball). The coating could not be peeled from the metal surface using a ½" blade scraping knife.

EXAMPLE II

Following the procedure of Example I, 60 grams of linear polyethylene screened through a 40 mesh screen were added with agitation to a dispersion medium consisting of 42 grams of xylene, 12 grams of propylene glycol methyl ether, and 24 grams of dipropylene glycol methyl ether. The dispersion medium had a specific gravity of 0.910 at 25° C. and a surface tension of 28.0 at 25° C. The resulting dispersion, containing 42.5% solids, was stable and quite suitable for spraying.

As in Example I, four metal panels were spray-coated with the dispersion. The resulting coatings had the same excellent properties as those described in Example I.

EXAMPLE III

Following the procedure described in the previous examples, 60 grams of linear polyethylene screened through 40 mesh were added with agitation to a dispersion medium consisting of 180 grams of hexylene glycol. The dispersion medium had a specific gravity of 0.9950 at 25° C. and a surface tension of 39.9 dynes/cm. at 25° C. The resulting dispersion, containing 25% solids, was stable and quite suitable for spray coating.

As described in Example I, four panels were spray coated until a uniform coating of the wetted polyethylene powder was obtained on the surface of the panels. The resulting coatings had the same excellent properties as those described in Example I.

EXAMPLE IV

Following the procedure described in the previous examples, 100 grams of linear polyethylene screened through 40 mesh were added with agitation to a dispersion medium consisting of 72 grams water, 22 grams hexylene glycol, and 12 grams propylene glycol methyl ether. The dispersion medium had a specific gravity of 0.995 at 25° C. and a surface tension of 34.9 dynes/cm. at 25° C. The resulting dispersion, containing 48% by weight polyethylene solids, was stable and uniform. Excellent coatings, similar to those described in Example I were prepared therewith.

EXAMPLE V

Following the procedure of the previous examples, 46 linear polyethylene dispersions were prepared with various dispersion media and evaluated for suspension stability over a minimum period of four hours. After the dispersions were prepared, they were stored in tightly capped eight ounce glass jars. The suspension stability was measured by determining the amount of liquid-polymer separation that occurred after a four-hour period had elapsed. Dispersions of good and very good stability showed only a very slight separation of the polymer and liquid phases. Excellent dispersions showed no separation of phases. Substantial sedimentation or floatation indicated the formation of an unstable dispersion.

The surface tension and specific gravity of the various dispersion media were measured with a Cenco Du-Nuoy tensiometer and a Taylor hydrometer respectively. The experimental results are shown below in Table I. The data of Table I is the basis for the plot of specific gravity versus surface tension of the drawing.

*Table I*

SURFACE TENSION AND SPECIFIC GRAVITY OF VARIOUS DISPERSIONS

| Formulation | | Surface Tension at 25° C. | Specific Gravity at 25° C. | Polyethylene Solids Content, Percent | Suspension Stability |
|---|---|---|---|---|---|
| Ingredient | Parts by Wt. | | | | |
| Water | 100 | 74.6 | 1.000 | 25 | Unstable. |
| Methanol / Water | 30 / 100 | 47.5 | 0.9615 | 20 | Do. |
| n-Butyl alcohol / Water | 6.5 / 100 | 28.6 | 0.9900 | 23 | Very good. |
| p-Amyl alcohol / Water | 1.5 / 100 | 33.4 | 0.9970 | 25 | Good. |
| Acetic Acid / Water | 25 / 100 | 51.4 | 1.026 | 21 | Unstable. |
| Ethyl ether / Water | 5 / 100 | 45.1 | 0.9900 | 20 | Do. |
| Ethylene glycolmono-methyl ether / Water | 22.5 / 100 | 55.7 | 1.0045 | 23 | Do. |
| Diethyleneglycolmonoethyl ether / Water | 15 / 100 | 53.4 | 1.0095 | 22 | Do. |
| Diethyleneglycolmonomethyl ether / Water | 20 / 100 | 53.5 | 1.0125 | 22 | Do. |
| Propylene glycolmonomethyl ether / Water | 30 / 100 | 44.2 | 0.995 | 22.5 | Do. |
| Tripropylene glycol monomethyl ether / Water | 20 / 100 | 42.5 | 1.008 | 24.0 | Good. |
| Diethylene glycol monobutyl ether / Water | 10 / 100 | 35.3 | 1.0015 | 25.7 | Excellent. |
| Diethylene glycolmonobutyl ether acetate / Water | 6 / 100 | 38.6 | 1.0020 | 23.6 | Do. |
| Diethylene glycolmonomethyl ether acetate / Water | 22.5 / 100 | 42.6 | 1.0150 | 24.8 | Good. |
| Propylene glycol / Water | 30 / 100 | 57.2 | 1.0175 | 22.1 | Unstable. |
| Hexylene glycol / Water | 20 / 100 | 39.9 | 0.9995 | 23.8 | Good. |
| 3-pentanone / Water | 3 / 100 | 48.2 | 0.9950 | 24.1 | Unstable. |
| Acetone / Water | 15 / 100 | 47.0 | 0.9810 | 19.7 | Do. |
| n-Propylamine / Water | 7.5 / 100 | 43.2 | 0.9830 | 26.3 | Do. |
| Triethanolamine / Water | 30 / 100 | 57.2 | 1.0325 | 21.7 | Do. |
| Water / Hexylene glycol / Propylene glycolmonomethyl ether | 60 / 30 / 15 | 34.9 | 0.995 | 25 | Excellent. |
| Water / Hexylene glycol | 72 / 36 | 34.3 | 0.998 | 26.0 | Do. |
| Water / Methanol / Propylene glycolmonomethyl ether | 72 / 48 / 12 | 36.2 | 0.918 | 26.0 | Good. |
| Water / Propylene glycolmonomethyl ether / Hexylene glycol / Methanol | 72 / 12 / 24 / 25 | 36.2 | 0.948 | 26.0 | Excellent. |
| Xylene | 155 | 28.6 | 0.860 | 22.5 | Unstable. |
| Petroleum naphtha | 155 | 25.1 | 0.780 | 22.5 | Do. |
| Propylene glycolmonomethyl ether | 120 | 26.9 | 0.919 | 27.3 | Good. |
| Dipropylene glycolmonomethyl ether | 155 | 28.8 | 0.951 | 22.5 | Very good. |
| Tripropylene glycolmonomethyl ether | 155 | 29.3 | 0.967 | 22.5 | Do. |
| Hexylene glycol | 155 | 28.3 | 0.9234 | 22.5 | Excellent. |
| Diethylene glycolmonobutyl ether | 155 | 30.3 | 0.9536 | 22.5 | Do. |
| p-Amyl alcohol | 155 | 25.6 | 0.8134 | 22.5 | Unstable. |
| n-Butyl alcohol | 155 | 24.9 | 0.8109 | 22.5 | Do. |
| Diethylene glycolmonobutyl ether acetate | 155 | 30.6 | 0.9810 | 22.5 | Very good. |
| Methanol | 155 | 23.3 | 0.7924 | 22.5 | Unstable. |
| Ethyl alcohol | 155 | 22.7 | 0.8030 | 22.5 | Do. |
| Methyl ethyl ketone | 155 | 23.5 | 0.8061 | 22.5 | Do. |
| Methyl isobutyl ketone | 155 | 23.6 | 0.8024 | 22.5 | Do. |
| Ethylene glycol | 155 | 47.5 | 1.1155 | 22.5 | Do. |
| Bromo benzene | 155 | 36.5 | 1.4991 | 22.5 | Do. |
| Acetic acid | 155 | 27.8 | 1.0510 | 22.5 | Do. |
| Oleic Acid | 155 | 32.5 | 0.8950 | 22.5 | Good. |
| Xylene / Propylene glycolmonomethyl ether / Dipropylene glycolmonomethyl ether | 42 / 12 / 24 | 28.0 | 0.910 | 22.5 | Do. |

*Table I*—Continued

| Formulation | | Surface Tension at 25° C. | Specific Gravity at 25° C. | Polyethylene Solids Content, Percent | Suspension Stability |
|---|---|---|---|---|---|
| Ingredient | Parts by Wt. | | | | |
| Xylene | 30 | 28.0 | 0.920 | 22.5 | Do. |
| Propylene glycolmonomethyl ether | 12 | | | | |
| Dipropylene glycolmonomethyl ether | 24 | | | | |
| Tripropylene glycolmonomethyl ether | 12 | | | | |
| Xylene | 12 | 28.6 | 0.940 | 22.5 | Excellent. |
| Propylene glycolmonomethyl ether | 12 | | | | |
| Dipropylene glycolmonomethyl ether | 30 | | | | |
| Tripropylene glycolmonomethyl ether | 18 | | | | |
| Xylene | 70 | 26.1 | 0.840 | 22.5 | Do. |
| Propylene glycolmonomethyl ether | 20 | | | | |
| Petroleum naphtha | 40 | | | | |

The data of Table I and the accompanying drawing make it readily apparent that it is essential that the liquid medium has a surface tension of 25–42.5 dynes/cm. at 25° C. and a specific gravity of 0.875–1.025 at 25° C. in order to form a stable linear polyethylene dispersion.

EXAMPLE VI

Dispersion media consisting of varying amounts of hexylene glycol and water were prepared. The surface tension and specific gravity of each medium was determined at 25° C. Thirty five grams of linear polyethylene were added to 100 grams of each of the various media with agitation and suspension stability was determined by the procedure described in Example V. The data is shown hereunder in Table II.

*Table II*

CHANGE IN SURFACE TENSION OF WATER-HEXYLENE GLYCOL DISPERSIONS

| Hexylene Glycol, parts by wt. | Water, parts by wt. | Surface Tension at 25° C. | Specific Gravity at 25° C. | Polyethylene Solids Content, percent | Suspension Stability |
|---|---|---|---|---|---|
| 5 | 100 | 49.7 | 0.9970 | 26 | Unstable. |
| 10 | 100 | 43.3 | 0.9970 | 26 | Do. |
| 15 | 100 | 39.2 | 0.9970 | 26 | Excellent. |
| 20 | 100 | 37.2 | 0.9970 | 26 | Do. |
| 25 | 100 | 36.0 | 0.9970 | 26 | Do. |

The data of Table II makes it quite plain that the surface tension of particular mixtures of liquid used to form the dispersion, rather than the type of liquid used, is of critical importance in the preparation of stable dispersions.

EXAMPLE VII

An attempt was made to prepare a stable dispersion using the teachings of French Patent No. 1,050,223, which describes a preparation of dispersions of non-linear polyethylene. A 25 gram quantity of linear polyethylene screened through 40 mesh was added with agitation to a dispersion medium consisting of 70 grams water, 2.5 grams n-propylamine and 2.5 grams ethyl alcohol. The specific gravity of the medium thus prepared was 0.984 at 25° C. and the surface tension was 47 dynes/cm. at 25° C. The polyethylene powder (25% solids) failed to disperse into the liquid phase to form a stable dispersion. Attempts to make spray coatings using the resulting mixture gave an unsatisfactory coating which was permeable, discontinuous, and lacked adherence to a steel substrate.

The solids content of the dispersion described hereabove was reduced to 5% in an attempt to form a stable dispersion. The resulting dispersion was still unstable.

EXAMPLE VIII

Using the procedure of Example I, linear polyethylene coatings were applied to a variety of substrates with excellent results. The substrates coated included: cold rolled steel, hot rolled steel, magnetic-type stainless steel, non-magnetic stainless steel, high carbon steel, cast iron, wrought iron, tin plated steel, Bonderized steel, cast aluminum, anodized aluminum, aluminum foil, extruded aluminum, copper tubing, kraft paper, coating stock paper, fiber board, chip board, cinder block, cement block, plywood, masonite, smooth glass, grit blasted glass, glass wool, and canvas. When glass, wood and cement substrates were used, the resulting coating had excellent adherence although the continuity of such coatings was not quite as good as that obtained using the metal and paper substrates

I claim:

1. A polyethylene dispersion suitable for coating comprising up to 60% by weight of a linear polyethylene dispersed in the absence of an emulsifying agent essentially by action of a liquid medium having a surface tension of about 25–42.5 dynes/cm. at 25° C. and a specific gravity of about 0.875–1.025 at 25° C.

2. A polyethylene dispersion suitable for coating comprising up to 60% by weight of a linear polyethylene dispersed in the absence of an emulsifying agent essentially by action of a liquid medium having a surface tension of about 25–42.5 dynes/cm. at 25° C. and a specific gravity of about 0.875–1.025 at 25° C., said dispersion being capable of being applied to a substrate to form thereon a continuous, adherent, flexible, linear polyethylene coating.

3. A stable polyethylene dispersion suitable for coating comprising 15 to 60% by weight of a linear polyethylene dispersed in the absence of an emulsifying agent essentially by action of a liquid medium, having a surface tension of about 25–42.5 dynes/cm. at 25° C. and a specific gravity of about 0.875–1.025 at 25° C., which is substantially inert to linear polyethylene and which has a boiling point below about 230° C.

4. A dispersion of claim 3 which contains 0.1 to 10% by weight of a pigment, based upon the weight of the polyethylene.

5. A dispersion of claim 3 which contains 0.01 to 0.1% by weight of an antioxidant, based on the weight of the polyethylene.

6. A polyethylene dispersion suitable for coating which is stable for at least four hours comprising 20 to 35% by weight of a linear polyethylene dispersed in the absence of an emulsifying agent essentially by the action of a liquid medium, having a surface tension of about 25–42.5 dynes/cm. at 25° C. and a specific gravity of about 0.875–1.025 at 25° C., which is substantially inert to linear polyethylene.

7. A stable polyethylene dispersion suitable for coating comprising 15 to 60% by weight of a linear polyethylene dispersed in the absence of an emulsifying agent essentially by the action of a liquid medium, having a surface tension of about 25–42.5 dynes/cm. at 25° C. and a specific gravity of about 0.875–1.025 at 25° C., consisting essentially of water in admixture with at least one organic liquid which is soluble in water to an extent sufficient to form a medium having the aforesaid surface tension and specific gravity.

8. A dispersion of claim 7 which contains 0.01 to 0.1 by weight of a rust inhibitor, based on the weight of the polyethylene.

9. A dispersion of claim 7 wherein the liquid medium is water in admixture with a glycol.

10. A dispersion of claim 7 wherein the liquid medium is water in admixture with a glycol and a glycol ether.

11. A stable polyethylene dispersion suitable for coating comprising 15 to 60% by weight of a linear polyethylene dispersed in the absence of an emulsifying agent essentially by the action of a liquid medium, having a surface tension of about 25–42.5 dynes/cm. at 25° C. and a specific gravity of about 0.875–1.025 at 25° C., consisting essentially of at least one organic liquid.

12. A dispersion of claim 11 wherein the liquid medium is hexylene glycol.

13. A dispersion of claim 11 wherein the liquid medium is a glycol ether.

14. A dispersion of claim 11 wherein the liquid medium is xylene in admixture with at least one glycol ether.

15. Method of preparing substrates having a continuous, impermeable, flexible, adherent linear polyethylene coating comprising forming a stable polyethylene dispersion comprising up to 60% by weight of a linear polyethylene dispersed in the absence of an emulsifying agent essentially by the action of a liquid medium having a surface tension of about 25–42.5 dynes/cm. at 25° C. and a specific gravity of about 0.875–1.025 at 25° C., applying said dispersion to a substrate to obtain a substantially uniform coating of wetted polyethylene thereon, heating the coated substrate at a temperature of about 175–230° C. to form on the substrate a continuous, impermeable, flexible linear polyethylene coating, and cooling the heated substrate.

16. A substrate coated by the process of claim 15.

17. Method according to claim 15 wherein the liquid medium consists essentially of water in admixture with at least one organic liquid.

18. Method according to claim 15 wherein the liquid medium consists essentially of at least one organic liquid.

19. Method of preparing substrates having a continuous, impermeable, flexible, adherent linear polyethylene coating comprising forming a polyethylene dispersion which is stable for at least four hours comprising 15 to 60% by weight of a linear polyethylene dispersed in the absence of an emulsifying agent essentially by the action of a liquid medium having a surface tension of about 25–42.5 dynes/cm. at 25° C. and a specific gravity of about 0.875–1.025 at 25° C., spraying said dispersion onto a substrate to obtain a substantially uniform coating of wetted polyethylene thereon, heating the coated substrate at a temperature of about 175–230° C. to form on the substrate a continuous, impermeable, flexible, linear polyethylene coating and cooling the heated substrate.

20. Method of preparing substrates having a continuous, impermeable, flexible, adherent linear polyethylene coating comprising forming a polyethylene dispersion which is stable for at least four hours comprising 15 to 60% by weight of a linear polyethylene dispersed in the absence of an emulsifying agent essentially by the action of a liquid medium having a surface tension of about 25–42.5 dynes/cm. at 25° C. and a specific gravity of about 0.875–1.025 at 25° C., dipping a substrate into said dispersion to obtain thereon a uniform coating of wetted polyethylene, heating the coated substrate at a temperature of about 175–230° C. to form on the substrate a continuous, impermeable, flexible linear polyethylene coating and cooling the heated substrate.

References Cited in the file of this patent

UNITED STATES PATENTS

| | | |
|---|---|---|
| 2,496,907 | Dawson | Feb. 7, 1950 |
| 2,496,989 | Cupery | Feb. 7, 1950 |
| 2,558,053 | Lee | June 26, 1951 |
| 2,567,108 | Hochberg | Sept. 4, 1951 |

OTHER REFERENCES

"Polythene," ed. by Renfrew & Morgan, Iliffe & Sons, Ltd. Pub. (London), January 1957.

UNITED STATES PATENT OFFICE
CERTIFICATE OF CORRECTION

August 4, 1959

Patent No. 2,898,233     Stanley Edward Hmiel

It is hereby certified that error appears in the printed specification of the above numbered patent requiring correction and that the said Letters Patent should read as corrected below.

Column 12, line 15, Table I - Continued, under the heading "Suspension Stability", for "Do." read -- Unstable --; column 13, line 1, for "0.1" read -- 0.1% --.

Signed and sealed this 16th day of February 1960.

(SEAL)
Attest:

KARL H. AXLINE
Attesting Officer

ROBERT C. WATSON
Commissioner of Patents